United States Patent
Nordquist

[11] Patent Number: 6,103,987
[45] Date of Patent: Aug. 15, 2000

[54] RETAINING PLATE FOR A MACHINE TOOL WORK PIECE

[75] Inventor: Hakon Nordquist, Taby, Sweden

[73] Assignee: System 3R International AB, Vällingby, Sweden

[21] Appl. No.: 09/146,526

[22] Filed: Sep. 3, 1998

[30] Foreign Application Priority Data

Sep. 7, 1997 [DE] Germany ............................ 197 39 059

[51] Int. Cl.[7] .................................................. B23H 1/00
[52] U.S. Cl. .................................... 219/69.12; 219/69.11; 219/68; 219/69.15
[58] Field of Search ......................... 219/69.12, 69.11, 219/68, 69.15

[56] References Cited

U.S. PATENT DOCUMENTS

| Re. 33,249 | 7/1990 | Schneider . | |
|---|---|---|---|
| 4,557,371 | 12/1985 | Yonezawa | 198/803.01 |
| 4,563,837 | 1/1986 | Ono | 51/34 R |
| 4,698,475 | 10/1987 | Lothenbach et al. . | |
| 4,855,558 | 8/1989 | Ramsbro . | |
| 4,859,824 | 8/1989 | Ukaji et al. | 219/69.15 |
| 5,634,757 | 6/1997 | Schanz . | |
| 5,791,803 | 8/1998 | Nordquist . | |
| 5,854,459 | 12/1998 | Buhler et al. | 219/69.12 |

FOREIGN PATENT DOCUMENTS

| 0117557 | 2/1984 | European Pat. Off. . |
|---|---|---|
| 111092 | 6/1984 | European Pat. Off. . |
| 255042 | 2/1988 | European Pat. Off. . |
| 722809 | 7/1996 | European Pat. Off. . |
| 4428310 | 2/1996 | Germany . |

Primary Examiner—Patrick Ryan
Assistant Examiner—M. Alexandra Elve
Attorney, Agent, or Firm—Jacobson, Price, Holman & Stern, PLLC

[57] ABSTRACT

The subject of the invention is a retaining plate for a machine tool work piece, where the machine tool is equipped with a tool, e.g. an erosion wire, that can be moved in th z-direction of a work area, and where the work area is bounded by an xy-plane that is perpendicular to the z-axis, and with a work table whose work surface is in a specific position relative to the xy-plane and which is arranged in the direction of movement of the tool. In order to provide a holding mechanism that is particularly suitable for wire EDM-machines, and which allows for work piece transition any number of times without loss of alignment precision, a first plane section of the retaining plate with at least one opening for inserting the work piece, as well as retaining mechanisms for the work piece are provided, as well as elements on the second section of the retaining plate that are suitable to function together with mating elements on a chuck mounted on the work table for precise positioning of the first section within the work area.

27 Claims, 2 Drawing Sheets

RETAINING PLATE FOR A MACHINE TOOL WORK PIECE

BACKGROUND AND SUMMARY OF THE INVENTION

The invention regards a retaining plate for a machine tool work piece, where the machine tool is equipped with a tool, eg. an erosion wire, that can be moved in the z-directon of a work area, and where the work area is bounded by an xy-plane that is perpendicular to the z-axis, and with a work table whose work surface is in a specifc position relative to the xy-plane and which is arranged in the direction of movement of the tool, The invention also regards a machine tool, particularly a wire EDM-machine.

For the purposes of electroerosive machining, particularly for precision small-lot production, it is necessary to transport the chuck-mounted work piece from one processing location to the next without changing work piece alignment, e.g. in an orthogonal system. Retaining plates with reference elements have been developed for use with cavity sinking EDM machines. These retaining plates work together with the mating elements of a machine chuck equipped with a clamping device in order to repeatedly position the work piece with high precision.

In the case of wire EDM-machines, holders of this type cannot be used because the erosion wire gets in the way and thereby prevents their use. It is the purpose of the invention to provide a retaining plate for the machined work piece that allows for any number of work piece transitions without loss of alignment precision during positioning, specifically in the case of wire EDM-machines.

According to the invention, the above-mentioned retaining plate is to have a first planar section that has at least one opening for inserting the work piece, with appropriate retaining devices for the work piece, and with a second section that has elements able to function together with mating elements on the work table chuck in order to permit repeated, precise positioning of the first section in the work area. After mounting the work piece in the opening, its position relative to the retaining plate will remain the same, so that the retaining plate can be transferred any number of times without loss of alignment precision. The retaining plate can be manufactured easily and cheaply because, with the exception of the reference elements, it does not require precision machining. During the machining procedure, most effective use of the work area can be made if the first section is kept at the lowest end of th work area limit, so that even large work pieces can be eroded.

Conveniently, the opening is completely surrounded by the first section; in addition, it is possible to equip the first section with several openings so that the retaining plate can hold several work pieces. Furthermore, it is preferable that a pilot bore be provided for the creation of the opening fitted to the shape of the work piece in the first section. The erosion wire may, for example, be threaded through the pilot bore, and the work piece opening may then be cut out of the first section.

The second section of the retaining plate creates a connection to the machine via the chuck in such a way as to allow not just for easy transfer of the work piece without loss of alignment precision, but also for compensation of positioning differences between work surface and work area, Therefore, depending on the individual machine tool design, the second section is usually offset across the surface expanse of the first section, with a stepped or slanted transition section being provided between the first and second sections of the retaining plate. In an extension of the invention, if the two opposite sides of the second section are equipped with profiles for the grippers of an automatic manipulator, the retaining plate according to the invention may be transferred with the mounted work piece from one work table to another.

Elements and mating elements may be designed according to the specific requirements of one of the known reference systems, such as in [European patents] EP-111092 or EP 255 042, or EP-A-722809. Thus, it is recommended that reference elements be provided on opposite sides, i.e. the top and bottom, of the retaining plate, so that the retaining plate may be turned 180 degrees. The design elements of the invention are indicated in the subordinate claims.

A detailed description of the invention is provided below, using the embodiment shown in the attached drawing.

DETAILED DESCRIPTION OF THE PREFERRED EMBODIMENTS

Figure 1:
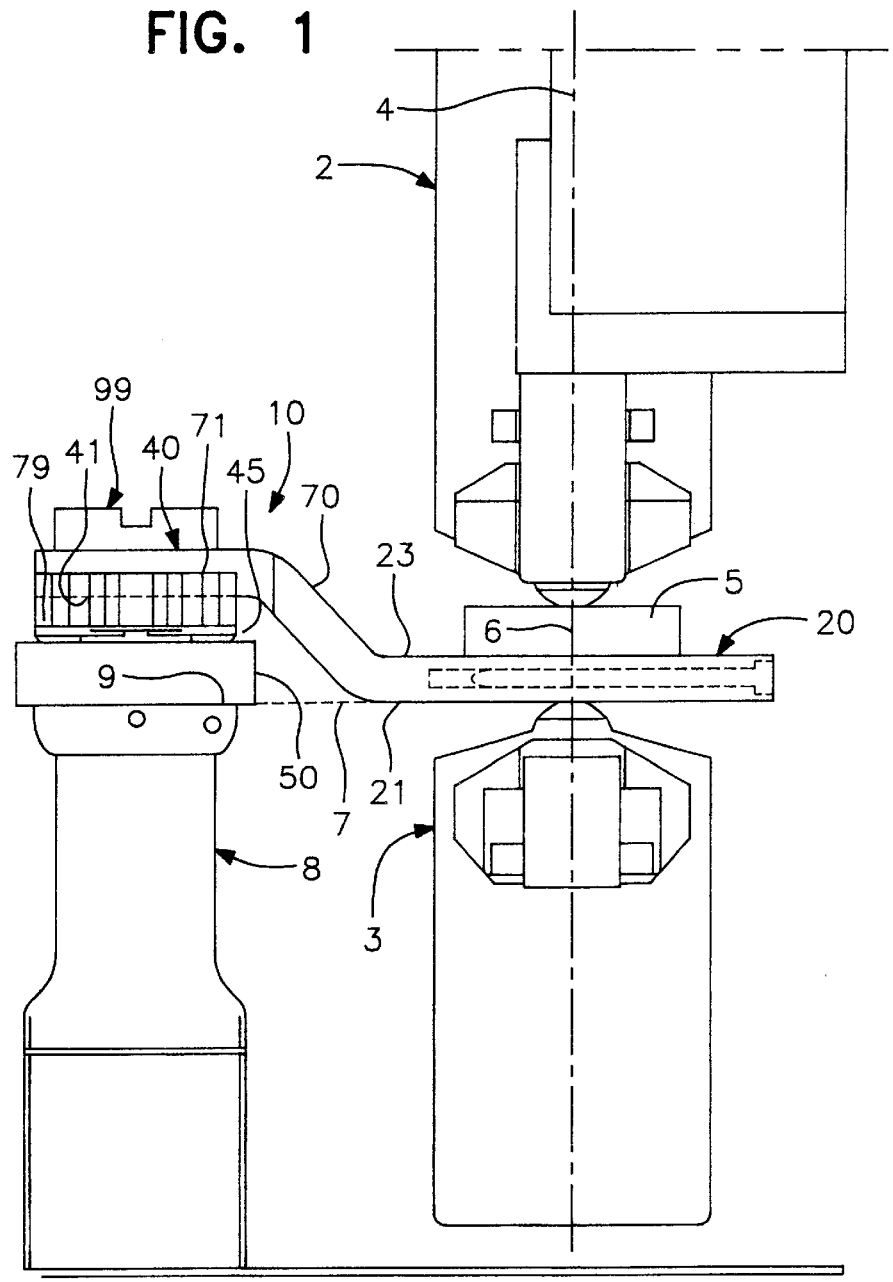
FIG. 1 shows a schematic side view of a wire EDM-machine using a retaining plate and chuck according to the invention to hold a machined work piece.

A wire EDM-machine is equipped with a head 2 and an underpart 3 directed towards the head 2, with an erosion wire 6 protruding from the lower end of the head after traversing the work area located between the head 2 and the underpart 3, and entering the underpart 3. The erosion wire is positioned so that it traverses the work area in the vertical z-direction. The work area, in which a workpiece 5 must be held in order to be able to be reliably cut by the erosion wire 6, is bounded by an upper and a lower horizontal plane. The lower of the two horizontal planes will henceforth be referred to as the xy-plane 7.

Next to the underpart 3 is the work table 8 whose upper work surface 9 is positioned on the xy-plane 7 according to the example shown here, and which can serve as the z-reference plane for initial alignment. A pneumatic chuck 50 with a tension rod 51 protruding upwards is permanently mounted on the work surface 9. The chuck is equipped with an actuator (not shown) for the tension rod 51. This actuator is connected to a controllable pneumatic pressure source. The mating reference elements 62, 64, 66 and 68, as well as 72, 74, 76 and 78, protrude from the top 52 opposite the work surface, around the central tension rod 51 in a crosspattern. Four of these mating reference elements consist of trunnions 62, 64, 66, and 68 with opposing beveled faces on the exposed ends, the other four mating reference elements consist of pillars 72, 74, 76, and 78 that re essentially cylindrical with a flat face. Between each pair of adjacent trunnions, there is a pillar, and the flat face of each pillar is positioned on a common plane parallel to the xy-plane 7. The trunnions, in their cuneiform arrangement, form the reference in the x and y-directions, while the flat faces of the pillars form the z-reference. This reference system is described in EP 255042.

The retaining plate 10 consists of a first, essentially level and flat section 20, and a second section 40, which is essentially parallel to the first section 20 and runs into the first section 20 via a transition section 70.

The top 23 and bottom 21 of the first section 20 are parallel to one another and perpendicular to the z-axis 4, if the retaining plate 10 is mounted on the chuck 50, which will be further explained below. The first section 20 has two pilot bores 36 and 38 near its edge. The erosion wire 6 can be threaded through either one of the bores. In addition, the first section has two adjacent openings 25 and 65. The first opening 25 can be used to insert a work piece 5 to be machined by the erosion wire 6. The machined piece can be mounted in the opening 25 using a retaining mechanism in the form of a clamping screw 32 that is positioned perpendicular to opening 25. Accordingly, a work piece 55 is also cylindrical is mounted in the second opening 65 using a clamping screw 34.

If the erosion wire is threaded through the pilot bore 36, opening 25 can be cut from the material of the retaining plate 10 with the erosion wire by moving the erosion wire exit on head 2 and the erosion wire entry on underpart 3 accordingly. If the erosion wire 6 is threaded through the pilot bore 38, the opening 65 can accordingly be eroded from the first section using the erosion wire 6. In this case, the erosion wire 6 can be moved so that the shape of the created opening 25 or 65 corresponds as closely as possible to the work piece 5 or 55 that is to be inserted Into the opening. The work piece 5 or 55 thereby maintain a fixed position relative to retaining plate 10 for all subsequent machining processes.

It is obvious that the position of the openings 25 and 65 in the first section 20 is not limited in any way. For a work piece with a relatively large diameter, it is possible to provide only one opening. For work pieces with smaller dimensions, even more than the two openings shown could be cut from the first section 20, each opening being equipped with a clamping screw to hold the corresponding work piece.

The side of the first section 20 without clamping screws directly adjoins the transition section 70, which slopes at 45 degrees to the second section 40 in the given embodiment of the invention. Depending on the position of the working surface 9 in the z-direction and the height of the chuck 50 in the z-direction 4 relative to the xy-plane 7, the angle may be larger or smaller, down to an angle of zero degrees. The angle is always chosen so that the bottom 21 is situated as close as possible to the xy-plane 7, and is not located below it, when the retaining plate 10 is mounted. This ensures the most efficient use of the work area, particularly in the case of work pieces that have a large z-direction 4 after mounting them in one of the openings 25 or 65.

The second section 40 is likewise essentially flat like section 20. The top 43 and bottom 41 of section 40 are parallel to the top 23 of the first section 20. There is a component 45 carrying references with exposed bottom ends on the bottom 41, which is constructed exactly or similarly as the other reference component 99 mounted on the top 43, which is aligned in the x- and y-direction and has references with exposed top ends, so that the references of component 45 and reference component 99 are positioned as mirror images of (symmetric to) one another. Because the reference component 99 in FIG. 2 is easier to visualize, it is described first.

The references on reference component 99 are identical to those described in detail in the context of an electrode holder in EP255042; so this document is referenced here. In the four corner areas of the exposed top of the reference component 99, flat surface pieces are formed, serving as z-references and together lying parallel to the xy-plane 7 (when the retaining plate 10 is mounted). These surface pieces are referred to as another group of elements 91, 93, 95, and 97 in the claim. In the center bet every two additional elements there is a groove incorporated into the side wall of the reference component 99, such that all four grooves are situated crosswise and are aligned with the opposite grooves. At the opposite exposed side of each groove a lip is formed by undercut which flexes axially or in the z-direction 4. Each groove with a corresponding pair of lips represents another element of a second group, these other elements being referred to as 92, 94, 96, and 98. It is apparent that these other four elements together form a reference in the x- and y-directions.

Figure 2:
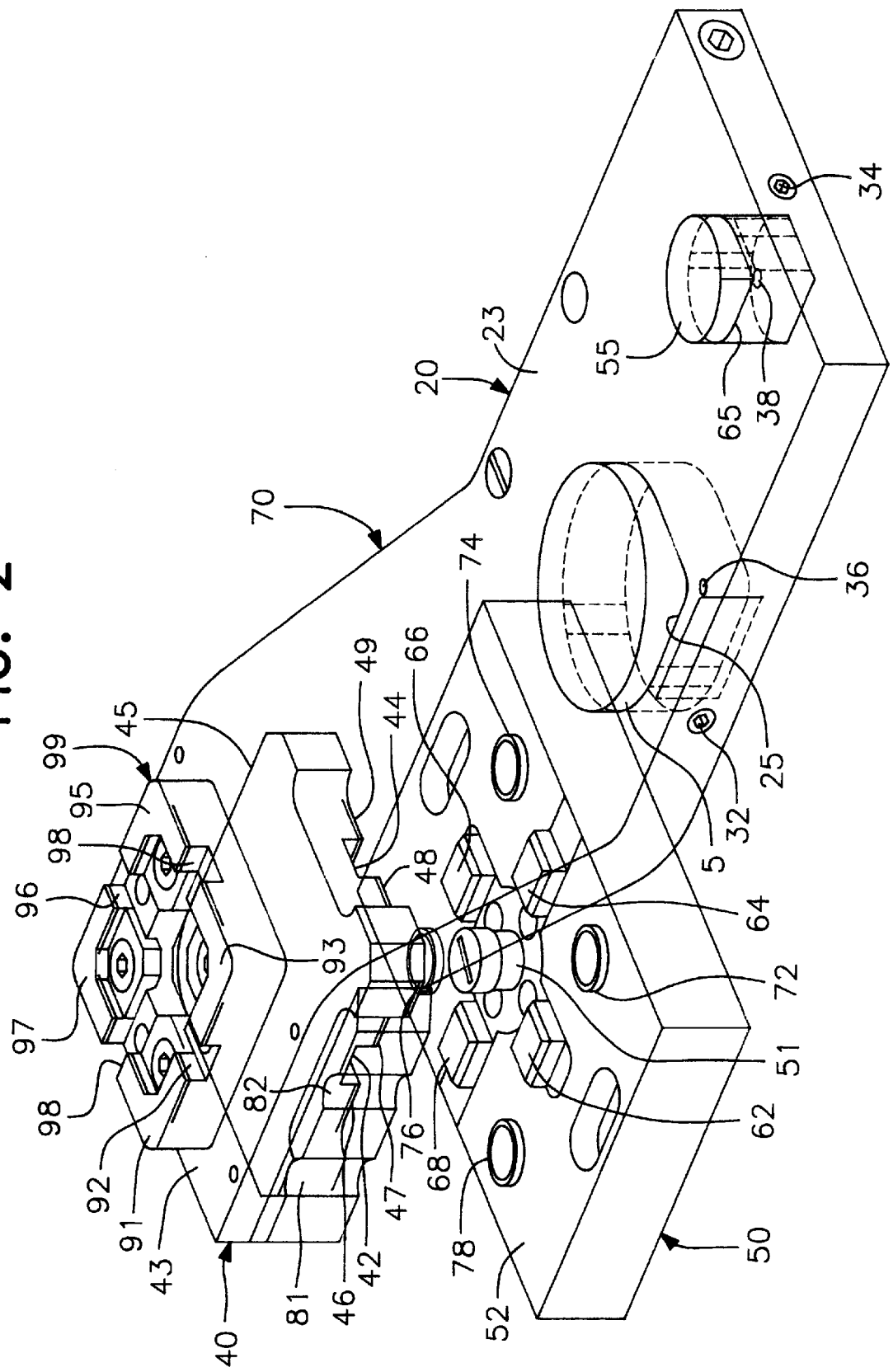
FIG. 2 shows a schematic perspective of the retaining plate with mounted work pieces and chuck according to FIG. 1.

In the schematic shown in FIG. 2, of the elements that form the x- and y-references, only elements 42 and 44 with the lip pairs 46, 47 and 48, 49, which correspond to the other elements 92, 94, 96 and 93 and are located directly beneath the other elements 92 and 94, can be seen. Since component 45 is identical or similar to reference component 99, component 45 also has pieces that correspond to the other elements 91, 93, 95, 97 and that serve as the z-reference, and of which only surface pieces 71 and 79 can be seen in FIG. 1. In the case of the retaining plate mounted on chuck 50, the surface pieces 71 and 79 (as well as the other two surface pieces that cannot be seen) are located on the exposed faces of pillars 72 and 78 (as well as pillars 76 and 78). At the same time, each of the trunnions 62, 64, 66, 68, with its beveled faces, engages in one lip pair 46, 47, or 48, 49, or between the two other lip pairs that are not shown.

If the retaining plate 10 is rotated 180 degrees from the position shown in FIGS. 1 and 2, surface pieces 91, 93, 95, 97 contact the exposed pillar faces 76, 74, 78, 72, respectively, and the trunnions 62, 64, 66, 68 engage between lip pairs of the other elements 96, 94, 93, 98, respectively, when the retaining plate 10 is mounted on the chuck 50. Turning the retaining plate 10 in this manner is advantageous especially if the work surface 9 is positioned far beneath the y-plane 7 in the z-direction 4, in order to ensure that the top 23 is positioned within the bounding plane of the work area, which is parallel to the xy-plane.

The reference component 99, as well th component 45, have a center recess into which the tension rod 51 can engage, detach and lock.

In order to mount the retaining plate 10 on the chuck 50 in the position shown in the two diagrams, component 45 is place on the top 52 of the chuck in such a way that the reference elements 42, 44 and the two reference elements of component 45 that cannot be seen can function together with the mating reference elements 62, 64, 66, 68 as described. In this case, the tension rod 51 moves into the center recess of component 45 and is anchored there. Then, the chuck is pressurized so that the actor of the tension rod 51 pulls into the chuck 50. This inward movement of the tension rod 51 is complete when the z-reference elements 71 and 79 (and the two that cannot be seen) come to rest on the exposed faces of reference elements 72, 74, 76, and 78. The retaining plate 10, and with it the work piece 5, is then positioned precisely in the x-, y- and z-directions. By reversing pressurization, the tension rod 51 can extend back out of the chuck 50 and detach from component 45, so that the retaining plate 10 can be removed from the chuck.

Placing the retaining plate 10 on the chuck or removing the retaining plate 10 from the chuck can also be accomplished automatically by using transport arm gripper of a manipulator (not shown), if profiles of the gripper match the profiles 81, 82 on the opposing sides of the second section 40.

Figure 3:
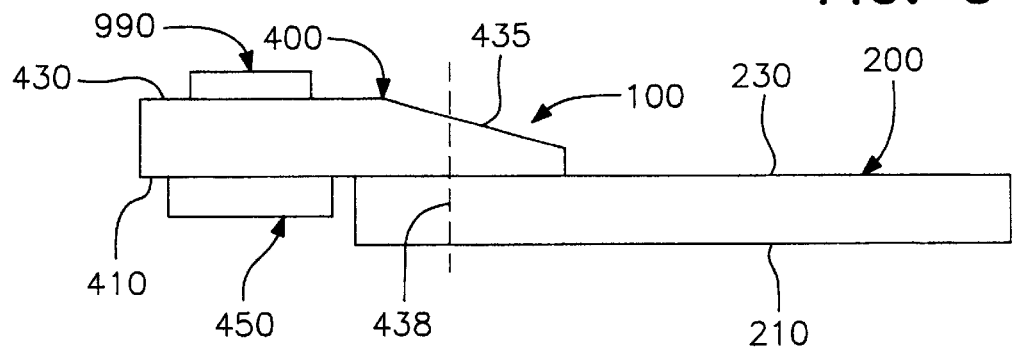
FIG. 3 shows another embodiment of the retaining plate according to the invention.

A preferred embodiment of the retaining plate 100 shown in FIG. 3 is of a two piece construction including the first section 200 and the second section 400 both bolted together. The first section 200 is a metal plate the flat top surface 230 of which is parallel to the flat bottom surface 210 thereof. Into the first section 200 one or more openings for holding one or more workpieces are formed which correspond to the openings 25 and 65, respectively of the above explained embodiment of section 20.

The second section 400 of the retaining plate 100 has a flat bottom surface 410 which is parallel to a flat outer portion 430 of the top of the second section. Upon the outer portion 430 a reference component 990 is mounted which corresponds to the reference component 99 as explained above. A component 450 carrying references similarly to the component 45 of the first embodiment is mounted to the bottom surface 410.

The outer portion 430 continues to an inner portion 435 of the top which slopes down towards the bottom surface 410. As shown the wedge like portion of the second section 400 is overlying a portion of the first section 200 which is free from any mounting holes for workpieces. Both sections 200, 400 are bolted together or otherwise connected, and line 438 indicates where aligned holes for bolts are driven into portion 435 and the underlying portion of section 200.

When the retaining plate 100 is mounted upon the chuck 50 the bottom surface 210 extends within the x-y-plane 7 of the work area of the wire-EDM-machine.

Not shown is yet another embodiment of the retaining plate made of a three part construction. Both the first section and the second section are flat metal plates which are fixedly connected one to the other through a third upright distance member balancing the different positions of the first and the second section in z-direction.

What is claimed is:

1. A retaining plate for retaining a work piece in a work area of a machine tool, the machine tool including a tool that is movable in a z-axis direction in the work area, the work area bounded by an xy-plane perpendicular to the z-axis, the machine tool including a work table having a chuck mounted thereon, the chuck including chuck mating elements for supporting the retaining plate, wherein the retaining plate includes a planar first section having at least one opening within which a workpiece is insertable and retaining elements for retaining the work piece within the opening, the retaining plate including a second section having retaining plate elements engageable with the chuck mating elements to enable repeatable precise positioning of said first section within the work area.

2. The retaining plate of claim 1, wherein the work table has a work surface at a specific position relative to the xy-plane with the chuck mounted on the work surface.

3. The retaining plate of claim 2, wherein the machine tool is a wire electrical discharge machine (EDM) and the vertically movable tool is an erosion wire.

4. The retaining plate of claim 2, wherein said first section and said second section are separate sections fixedly connected to each other.

5. The retaining plate of claim 4, wherein said first section and said second section have overlapping portions and are connected together at the region of the overlapping portions.

6. The retaining plate of claim 5, wherein the first section is connected to said second section by at least one bolt.

7. The retaining plate of claim 2, wherein said first section completely surrounds said at least one opening.

8. The retaining plate of claim 2, wherein said first section has several openings arranged next to one another.

9. The retaining plate of claim 2, wherein said first section has at least one pilot bore to receive the tool for creating said at least one opening corresponding to the form of the work piece.

10. The retaining plate of claim 2, wherein said retaining elements include clamping screws that are oriented perpendicular to the z-axis in the first section.

11. The retaining plate of claim 2, wherein said first section has an essentially horizontal bottom.

12. The retaining plate of claim 2, wherein said first section has an essentially horizontal top.

13. The retaining plate of claim 2, wherein said first section has horizontal top and bottom surfaces oriented perpendicular to the z-axis direction when the retaining plate is mounted to said chuck.

14. The retaining plate of claim 2, wherein said second section is offset relative to the first section and a transition piece, sloped or stepped in form, is located between the first and second section.

15. The retaining plate of claim 2, wherein said retaining plate elements include two groups, where the retaining plate elements of the first group orient the first section in a plane parallel to the xy-plane, and the retaining plate elements of the second group orient the first section in the z-axis direction.

16. The retaining plate of claim 15, wherein said retaining plate elements of the first group are arranged in a cross pattern.

17. The retaining plate of claim 15, wherein said retaining plate elements of the second group are arranged in a cross pattern and situated such that, between two adjacent elements of one of said first and second groups is an element of the other group.

18. The retaining plate of claim 2, wherein said retaining plate elements are arranged in a common plane that is perpendicular to the z-axis direction when the retaining plate is mounted to said chuck.

19. The retaining plate of claim 2, wherein the retaining plate elements are arranged at the bottom of the second section.

20. The retaining plate of claim 18, wherein each element of the first group has at least one axially elastic lip at the edge of a groove.

21. The retaining plate of claim 15, wherein each element of the second group includes an axially protruding pillar, where the exposed faces of all of the pillars are located in a common plane.

22. The retaining plate of claim 2, wherein said second section includes top retaining plate elements located on a top surface of the second section and bottom retaining plate elements located on a bottom surface of the second section, wherein the top retaining plate elements are mirror images of (symmetrical to) the bottom retaining plate elements in terms of shape, arrangement and grouping.

23. The retaining plate of claim 22, wherein said top retaining plate elements are part of a reference system that is different from the reference system of the bottom retaining plate elements.

24. The retaining plate of claim 2, wherein said chuck mounted on the work table is hydraulically or pneumatically actuated.

25. The retaining plate of claim 24, wherein said chuck mating elements are arranged in a plane that is perpendicular to the z-axis direction.

26. The retaining plate of claim 2, wherein said second section is offset in relation to the first section such that the bottom of said first planar section does not reach beyond the lower boundary of the work area when the retaining plate is mounted to said chuck.

27. The retaining plate of claim 2, further comprising profiles on the second section for a gripper of an automatic manipulator.

\* \* \* \* \*